(12) United States Patent
Krohn

(10) Patent No.: US 10,527,064 B2
(45) Date of Patent: Jan. 7, 2020

(54) PNEUMATIC PUMP

(71) Applicant: SOLIDSVAC PTY LTD, Woorim (AU)

(72) Inventor: Mark Damien Krohn, Woorim (AU)

(73) Assignee: SOLIDSVAC PTY LTD, Woorim (AU)

( * ) Notice: Subject to any disclaimer, the term of this patent is extended or adjusted under 35 U.S.C. 154(b) by 440 days.

(21) Appl. No.: 15/319,540

(22) PCT Filed: Jun. 18, 2014

(86) PCT No.: PCT/AU2014/000632
§ 371 (c)(1),
(2) Date: Dec. 16, 2016

(87) PCT Pub. No.: WO2015/192161
PCT Pub. Date: Dec. 23, 2015

(65) Prior Publication Data
US 2017/0321725 A1 Nov. 9, 2017

(30) Foreign Application Priority Data

Jun. 16, 2014 (AU) ................. 2014902302

(51) Int. Cl.
*F04F 5/24* (2006.01)
*F16K 1/20* (2006.01)
(Continued)

(52) U.S. Cl.
CPC .............. *F04F 5/24* (2013.01); *F04F 1/02* (2013.01); *F04F 5/48* (2013.01); *F04F 5/54* (2013.01); *F16K 1/2007* (2013.01); *B65G 53/28* (2013.01)

(58) Field of Classification Search
CPC ........ F04F 1/02; F04F 5/14; F04F 5/24; F04F 5/42; F04F 5/48; F04F 5/54; F04F 1/06;
(Continued)

(56) References Cited

U.S. PATENT DOCUMENTS 2,141,427 A * 12/1938 Bryant .................. F04F 1/02
417/120
3,052,260 A 9/1962 Weis
(Continued)

FOREIGN PATENT DOCUMENTS

WO 2013080179 A1 6/2013

OTHER PUBLICATIONS

International Search Report & Written Opinion dated Oct. 20, 2014; PCT/AU2014/000632 filed Jun. 18, 2014; pp. 1-12.

*Primary Examiner* — Kenneth J Hansen
*Assistant Examiner* — Chirag Jariwala
(74) *Attorney, Agent, or Firm* — FisherBroyles LLP; Kevin D. Jablonski

(57) ABSTRACT

There is provided a pneumatic pump (10) comprising a tubular steel frame (11) and a disc-shaped pressure vessel (12) including a lower, tangential transfer port (14) and an upper, radial ventilation port (15). A transfer assembly (16) on the port (14) includes an inlet assembly (17) having a positive-close non-return valve (21) and a delivery outlet assembly (20). A venturi assembly (22) applies suction to the ventilation port (15) and has an exhaust vent (24) including a closure assembly (25) selectively operable to cycle between a suction phase and a pressurized phase. A two way T-valve (40) selectively allows venturi exhaust air to pass selectively into either a diffuser/muffler (35) or a delivery line (42) downstream of an outlet non-return valve.

12 Claims, 4 Drawing Sheets

(51) Int. Cl.
*F04F 1/02* (2006.01)
*F04F 5/48* (2006.01)
*F04F 5/54* (2006.01)
*B65G 53/28* (2006.01)

(58) Field of Classification Search
CPC ........... F04F 99/00; F04B 17/06; F04B 35/06;
F04B 37/10; F04B 39/08; F04B 39/14;
F04B 53/10; F04B 53/1037; F04B
53/1085; F16K 15/181; F16K 31/12;
F16K 15/00; F16K 1/2007; B65G 53/28
USPC ....... 417/137, 151, 182, 143, 144, 178, 191;
137/565.13, 565.22
See application file for complete search history.

(56) References Cited

U.S. PATENT DOCUMENTS

| | | | |
|---|---|---|---|
| 3,861,830 A | 1/1975 | Johnson | |
| 4,637,425 A | 1/1987 | Petersen | |
| 4,770,611 A * | 9/1988 | Heyl | B65G 53/525 |
| | | | 137/907 |
| 5,007,803 A * | 4/1991 | DiVito | F04F 1/02 |
| | | | 417/137 |
| 6,755,207 B1 | 6/2004 | Curtis et al. | |
| 8,307,853 B2 * | 11/2012 | Bizzarro | B64D 37/32 |
| | | | 137/861 |
| 2015/0107680 A1 * | 4/2015 | Chapman, Jr. | F04C 29/126 |
| | | | 137/12 |

* cited by examiner

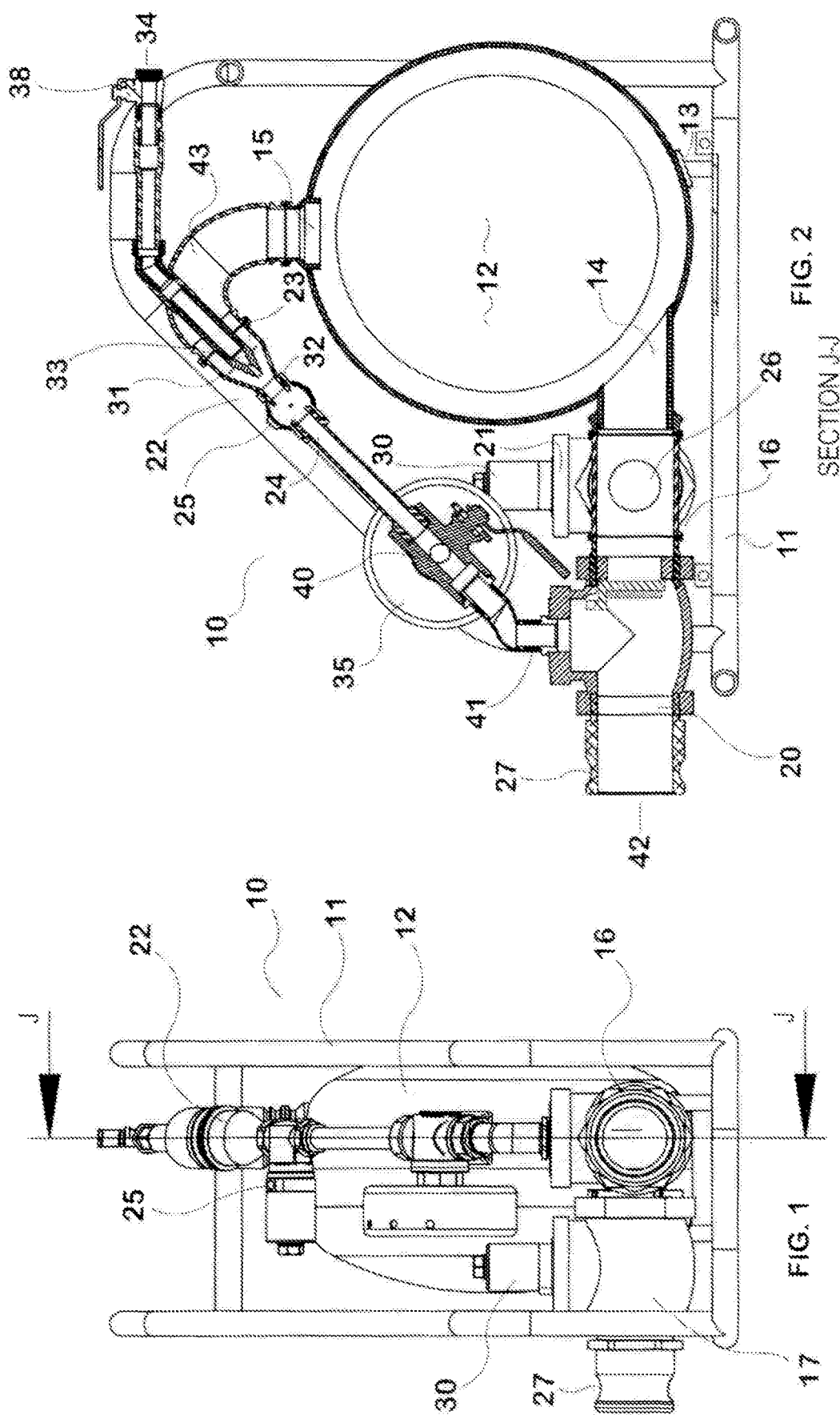

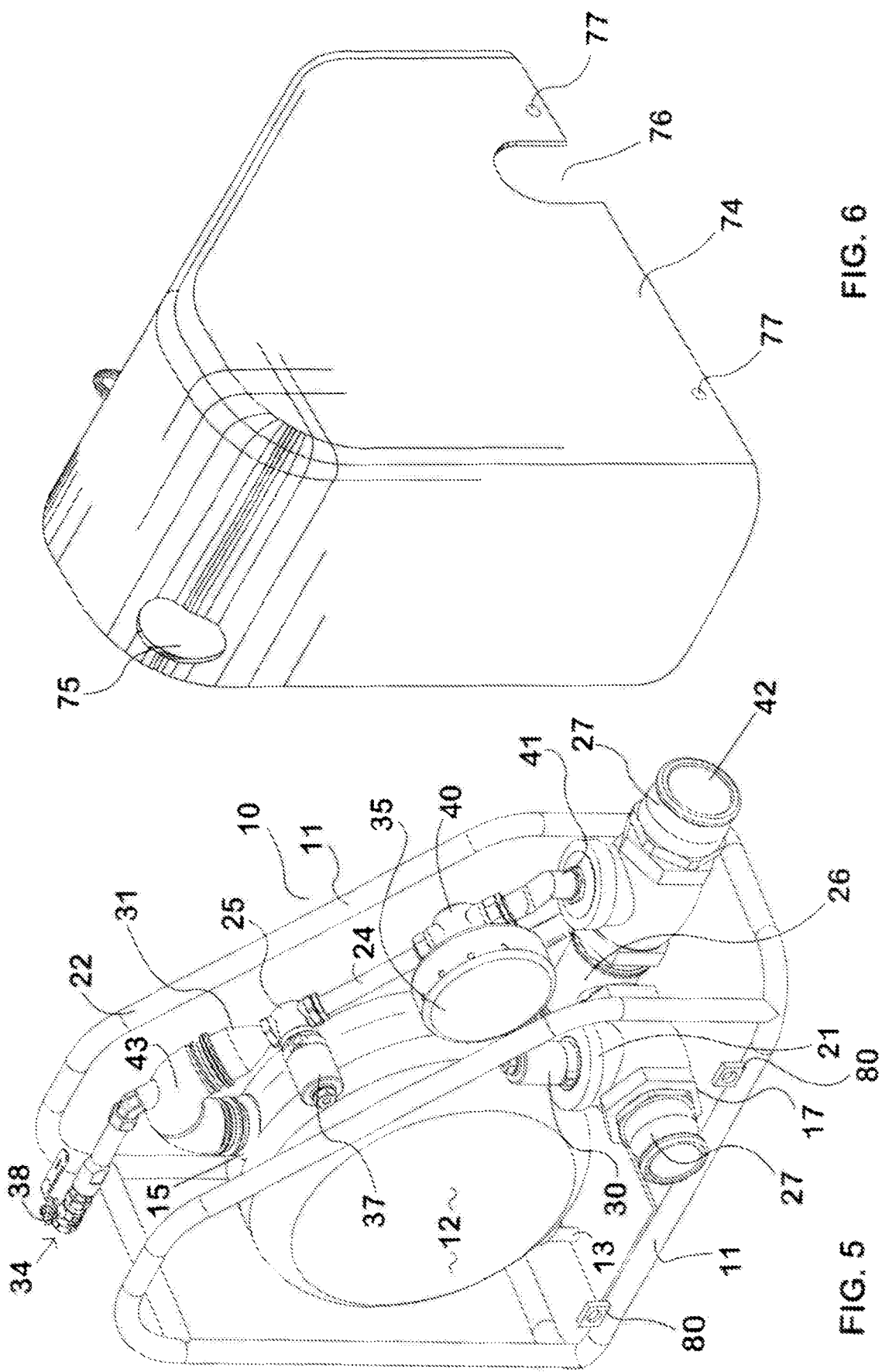

PNEUMATIC PUMP

FIELD OF THE INVENTION

This invention relates to a pneumatic pump. This invention has particular application to a pneumatic pump for pumping flowable waste compositions, chip-entraining spent drilling muds and the like, and for illustrative purposes the invention will be described with reference to this application. However we envisage that this invention may find use in other applications such as continuous-phase liquids, non-homogeneous particulate-solids-in-liquids compositions, and flowable particulate solids per se such as grain.

BACKGROUND OF THE INVENTION

The reference to any prior art in this specification is not, and should not be taken as, an acknowledgement or any form of suggestion that the referenced prior art forms part of the common general knowledge in Australia.

Pneumatic pumps may be used for pumping flowable compositions in hot or chemically and physically aggressive environments. The compositions may be intractable to rotary, piston and diaphragm pumps, or may be environments where motive means such as IC or electric motors cannot be used. The general configuration of such pumps comprises a pressure vessel cyclically transitioned between an intake cycle where compressed air is used to lower the internal pressure of the vessel by venturi effect to draw material in and a discharge cycle where the venturi is stalled or choked to pressurize the vessel and expel the material.

The straightforward general principle of operation must be optimized for the apparatus to be practical. Efficiency may demand that the delivery and/or inlet ports to the pressure vessel are controlled by gates. Control means may control timing of venturi cycle between vacuum and pressure phases, and control operation of any gate on the inlet and outlet. Control means may respond to time or charge mass to optimize cycle volumes.

Conventional configurations of the pressure vessel usually include that the vessel is in the form of a solid of rotation to resist distortion under pressure, locates the material outlet at the lowest point to maximize gravity assistance, and spatially separates the inlet and the outlet. For example, the pressure vessel may comprise a vertical-axis vessel having a conical lower portion and a domed upper portion, wherein the inlet is toward the top of the vessel and the outlet is toward the bottom. In other embodiments a horizontal-axis vessel may comprise a dome-ended cylinder with the inlet and outlet separated both horizontally and vertically.

The prior art apparatus works well for large scale apparatus, but does not appear to scale down well for portable apparatus. In the first instance, the shape of conventional designs does not admit of a compact package. Secondly the size of inlets and outlets (confined by the materials) cannot scale down as far as the size of the pressure vessel by proportions, resulting in volumetric inefficiency.

SUMMARY OF THE INVENTION

This invention in one aspect resides broadly in a pneumatic pump including:
a supporting frame;
a pressure vessel supported by said frame and having a lower transfer port and an upper ventilation port;
a transfer assembly communicating with said transfer port and including an inlet for pumpable material, and a delivery outlet, one or both of said inlet and said outlet having a non-return valve;
a compressed air-operated venturi assembly having a suction side communicating with said ventilation port and an exhaust vent including closure means selectively operable to cycle said ventilation port between a suction phase and a pressurized phase; and
control means being adapted to selectively operate said closure means.

The supporting frame may take the form of a portable or transportable frame of metal or the like. The supporting frame may support all of the components of the apparatus as an assembly, whereby only fluid connections are required to put the assembly into service. The supporting frame may include roll-over or other in-service protection, such as roll-over bars, cage components or the like. The supporting frame may be provided with lifting points or adaptations for forklifting. The supporting frame for smaller installations may comprise a tubular steel frame, preferably of all-welded construction.

The pressure vessel may be formed principally from any suitable material including but not limited to metal or reinforced polymer. The pressure vessel may be of any conventional shape. However, it has been determined that for smaller devices a spherically-derived shape is preferred. Especially it has been empirically determined that the best compromise between useful volume, small overall size, and width to height ratio is provided by using a pressure vessel in the form of a disc, essentially a sphere flattened in the vertical plane to be taller and longer in the supporting frame than it is wide. Such a pressure vessel may have a narrow dimension selected to enhance access to relatively narrow industrial spaces.

The transfer port may penetrate the pressure vessel at any relatively lower position but is preferably at the lowest point. The transfer port may penetrate the pressure vessel in any orientation. For example a conical lower portion may advantageously include a transfer port oriented on the substantially vertical axis in the manner of a hopper chute. In the case of the spherical or disc-like pressure vessel the penetration of the transfer port may be either parallel to the disc axis (through the flattened side wall) or substantially perpendicular to the vertical plane containing disc axis (substantially tangential to the annular rim of the disc).

The transfer assembly may comprise a conduit extending from the transfer port. The conduit may include a T-connection with side branch connection substantially adjacent the transfer port and an axial connection adjacent the side branch connection, or may in the alternative comprise a Y-connection. In the case of a T-connection the side branch may comprise the inlet and the axial branch may comprise the outlet for the minor efficiency benefit conferred by this arrangement. The inlet and the outlet may be configured with quick-release coupling means such as cam-lock couplings.

One or both of the inlet and outlet are fitted with a non-return valve and the choice will be determined at least in part by the application. The non-return valve may in each case be selected from passive and active valve means. Active valve means may include a knife gate valve operated under the control of the control means. However, it is preferred that the valve means be passive such as a swing valve.

In some practical applications the inlet will be connected to a material source delivered by a head of pressure. In this instance the apparatus may be fitted with just an outlet non-return valve to resist aspiration of contents from a delivery line downstream of the outlet on the vacuum phase of the venturi. In other applications the inlet may be fitted with a non-return valve to reduce the reflux of pressure vessel contents back up a supply conduit connected to the inlet during the pressure phase of the venturi. Efficiency may be optimized by fitting a non-return valve to both of the inlet and the outlet.

In the application of pumping non-homogeneous materials, the preferred swing valve or valves may suffer from a statistical distribution of cycles where closure is incomplete. It has been determined that the passive operation of a swing valve may be enhanced by closure-assist means. For example, the swing valve may be positively assisted and maintained in a closed position by an actuator as described hereinafter. The actuator may be controlled in concert with the closure means.

The compressed air-operated venturi assembly may comprise an elongate venturi body comprising a venturi orifice interposed between the suction side communicating with said ventilation port and the exhaust vent. The orifice may cooperate with a constant-flow air jet supplied by an external compressed air source to induce depression in the suction side of the body upstream of the jet. During the suction phase the open closure means may allow the venturi exhaust to vent through a diffuser and/or muffler to reduce high-dB air screech.

The closure means may take any form consistent with allowing substantially open flow of venturi exhaust during the suction phase, and allowing sufficient occlusion of venturi exhaust during the pressurized phase. The closure means may be selected from butterfly valves, gate valves, iris valves, slide valves and ball valves. The valve closure means may be selected to provide an opening cross section substantially the same as or bigger than the cross section of the venturi orifice. The valve closure means may be selected to have low inertia and/or be balanced to enhance speed of action.

The closure means may be operated by any suitable actuator. The obligatory presence of a source of compressed air and the lack of useful electrical power in some operating environments mandates that a pneumatic actuator be preferred. The actuator may comprise a rotary actuator or a linear actuator. The actuator may be a single-action actuator cycling against a return spring or may comprise a double-action actuator, depending on the operating parameters of the control means.

The control means may comprise a digital-electronic over electric or pneumatic control means, an analogue air over electric or pneumatic control means. In order to provide for an air-only system, a simple air control over air deliver system may be used. For example, a combination of air solenoids and delay-dashpots may be used to provide for simple time-dependent cyclic control. Alternatively an air-analogue programmable logic controller may be used.

The energy of the venturi exhaust air may be utilized to optimize delivery line performance by being injected to the delivery line downstream of an outlet non-return valve. For example, the venturi exhaust air may be selectively passed through a two-way valve whereby one way vents to atmosphere and the alternative way vents into the material outlet downstream of a non-return valve. The two way valve may for example comprise a ball-tee valve. The two way valve may be manual, remote-controlled, or demand operated by condition-responsive means.

While the working venturi is generally straight, the body upstream of the jet and orifice may be a curved conduit connected to the ventilation port, whereby the venturi and exhaust axis may be directed in a straight line toward the material outlet despite lack of clear line of sight between the ventilation port and the material outlet.

As described above the inlet and/or outlet may be equipped with swing non-return valves that are closure assisted to alleviate tendency to fouling. In another aspect there is provided a swing valve apparatus including:

a valve body having a swing chamber interposed between an inlet and an outlet;

an annular valve seat located in said swing chamber about an opening into said inlet;

a valve gate pivotally mounted in said chamber and adapted to move between a closed position substantially occluding said opening and an open position whereby fluid may pass from said inlet to said outlet; and valve closer means operable to selective urge and maintain said valve gate in said closed position.

The valve body may be substantially convention for such swing valves and may be of bronze, stainless steel, reinforced polymer or other material. The inlet and outlet may be integrally formed with connector means including but not limited to male or female threaded portions, quick release connectors such as cam-locks, bayonet connections or the like. In the way of such valve bodies there is generally provided a chamber extension or turret extending away from the flow axis and through which the valve gate may be pivotally installed the valve body. The chamber extension is most often includes a bore that is substantially perpendicular to the flow path through the valve.

The valve gate may comprise a valve closure disc portion adapted to cooperate with the annular valve seat and a body portion pivoted to the walls of the chamber extension. The body portion may include means to cooperate with valve closer means associated with the chamber extension. For example, the body portion may include a surface that a selectively operated closer means may cooperate with the effect closure and maintenance of the valve gate on the closed position.

In the case of the pumps described above, a valve gate assembly may comprise a supporting body pivoted to the walls of the chamber extension and having a front surface that mounts a resilient valve closure disc with, for example, a bolt and spreader washer. The front surface may lie in a plane that includes the pivotal axis of the valve gate. The supporting body may have a back surface adapted to cooperate with the valve closer means.

The valve closer means may comprise a linear actuator that is adapted to utilize the transverse extension and is mounted to present a push rod adapted to pass closely adjacent the back or body portion surface. In order that there be provided an initial closing force the back or body portion surface may include a camming surface portion that the pushrod will first contact if the valve is not fully closed.

In one embodiment of the present invention the swing valve is for use on the inlet side of a pump in accordance with the present invention and may include a valve closer assembly including a double acting pneumatic linear actuator mounted coaxially with and closing the top end of a swing valve chamber extension. The actuator may include a push rod adapted to engage a body surface portion of a valve gate having a camming surface at the point of first contact of the push rod with the valve gate and closure maintenance portion engaged on substantially full closure.

BRIEF DESCRIPTION OF THE DRAWINGS

The invention will be described with reference to the following non-limiting embodiment of the invention as illustrated in the drawings and wherein:

FIG. 1 is a front view of pneumatic pump apparatus in accordance with the present invention;

FIG. 2 is a sectional side view of the apparatus of FIG. 1;

FIG. 5 is a perspective view of the apparatus of FIG. 1; and

FIG. 6 is a cover for the apparatus of FIG. 1.

Figure 3:
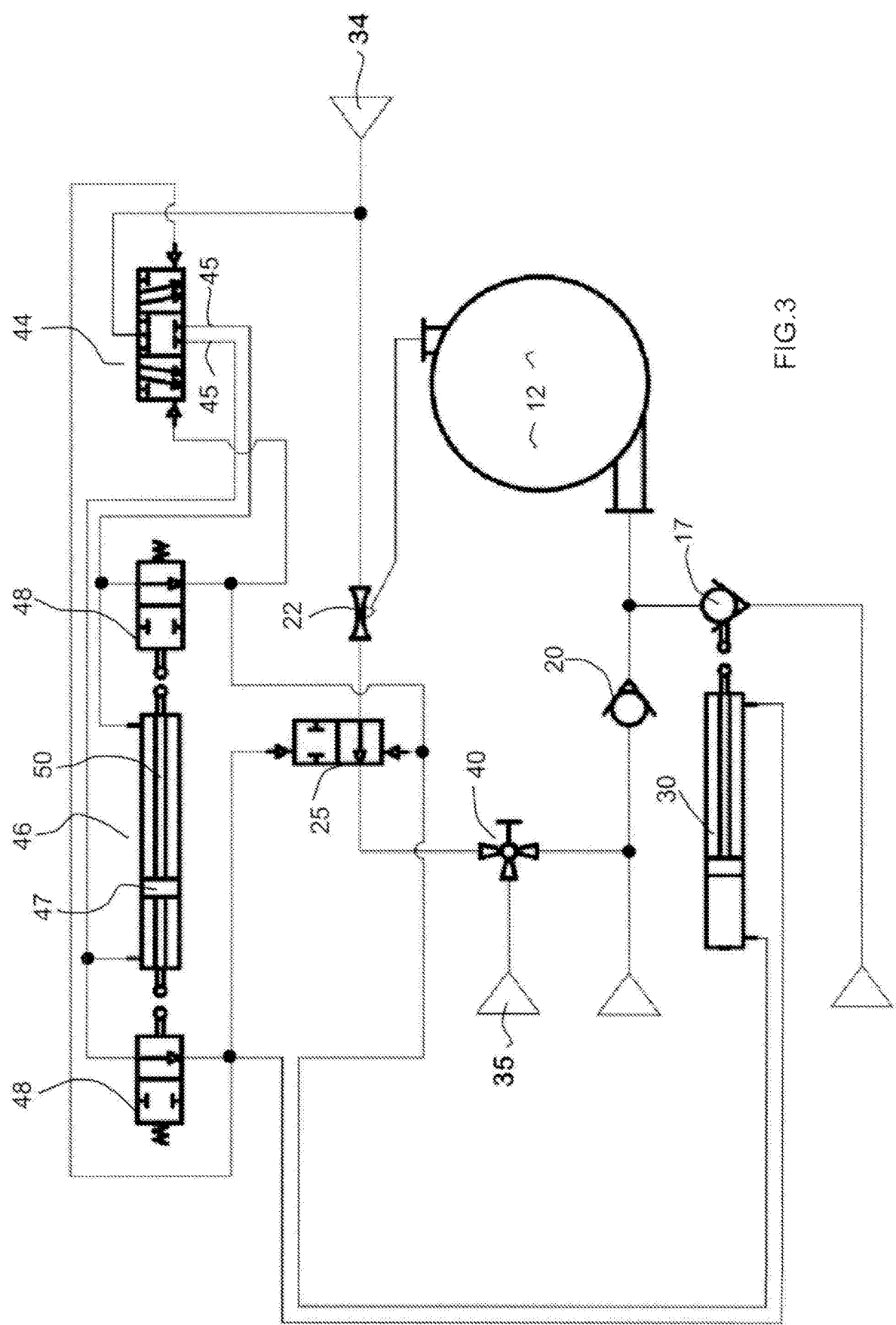
FIG. 3 is a diagram of air, fluid and control flows of the apparatus of FIG. 1.

In the figures there is illustrated a pneumatic pump 10 comprising a supporting tubular steel frame 11 and a steel, disc-shaped pressure vessel 12 supported on the frame at anchor points 13. The steel pressure vessel 12 includes a lower, tangential transfer port 14 and an upper, radial ventilation port 15.

A transfer assembly 16 communicates with the transfer port 14 and includes an inlet assembly 17 for pumpable material, and a delivery outlet assembly 20. The inlet assembly 17 includes a positive-close non-return valve 21, described in more detail hereinafter.

The ventilation port 15 mounts a compressed air-operated venturi assembly 22 having a suction side 23 communicating with the ventilation port 15 and an exhaust vent 24 including a closure assembly 25 selectively operable to cycle the ventilation port 15 between a suction phase and a pressurized phase.

The inlet assembly 17 and delivery outlet assembly 20 in this embodiment essentially comprise respective swing valve assemblies mounted on adjacent branches of a T-connector 26 connected to the transfer port 14. Each of the swing valve assemblies 17, 20 is provided with terminal camlock connectors 27. The inlet swing valve assembly 17 includes a positive-close actuator 30, described in more detail hereinafter.

The venturi assembly 22 comprises an elongate venturi body 31 including a venturi orifice 32 interposed between the suction side 23 communicating with the ventilation port 15 and the exhaust vent 24. The orifice 32 cooperates with a constant-flow air jet 33 supplied by an external compressed air source 34 to induce depression in the suction side 23 of the body 31 upstream of the jet 33. During the suction phase the open closure assembly 25 allows the venturi exhaust to vent through a diffuser/muffler 35 to reduce high-dB air screech.

The closure assembly 25 comprises a low-inertia ball valve, lubricationless ball valve 36 operated by a single action, spring return pneumatic actuator 37. The air source 34 may be shut off by a stop cock 38, providing a master on-off switch for the apparatus.

The diffuser/muffler 35 is mounted on a side branch of a manual two way T-valve 40, the straight-through path of the T-valve 40 being in fluid communication with a modified top cap 41 on the outlet swing valve assembly 20, thereby allowing venturi exhaust air to pass selectively into either the diffuser/muffler 35 or the delivery line 42 downstream of the outlet non-return valve. In order to maintain a straight venturi exhaust flow path, the venturi body 31 upstream of the jet 33 and orifice 32 may be a curved conduit 43 connected to the ventilation port 15.

In FIG. 3 is illustrates an embodiment of a control arrangement of the apparatus of FIGS. 1 and 2 wherein the compressed air source 34 supplies (at supply pressure) both the venturi assembly 22 and a double switching (push-pull) primary air solenoid 44. The air distributed by two outlets 45 of the solenoid 44 pass to respective ends of a double acting pneumatic dashpot 46 which acts as a timer element. The piston 47 of the dashpot 46 mounts a double ended rod 50 which, at the respective ends of travel triggers a respective air switch 48 providing feedback control to the solenoid 44.

The venturi assembly 22 depresses the pressure vessel 12 when the closure assembly 25 is open, whereupon exhaust air may pass, depending on the setting of the manual T-valve 40 to the diffuser/muffler 35 or into the delivery line downstream of the swing non-return valve 20.

The timer element push-pulls the closure assembly 25 to timer-operate the cycling of the venturi assembly 22 between the suction and pressurization phases. Simultaneously with the pressurisation phase commencing, the slow-acting (dashpot), push-pull, positive-close actuator 30 positively closes the swing valve gate 17. On transition to the suction phase, positive-close actuator 30 slightly delays opening of the swing valve gate 17, allowing vacuum accumulation in the pressure vessel 12.

Figure 4:
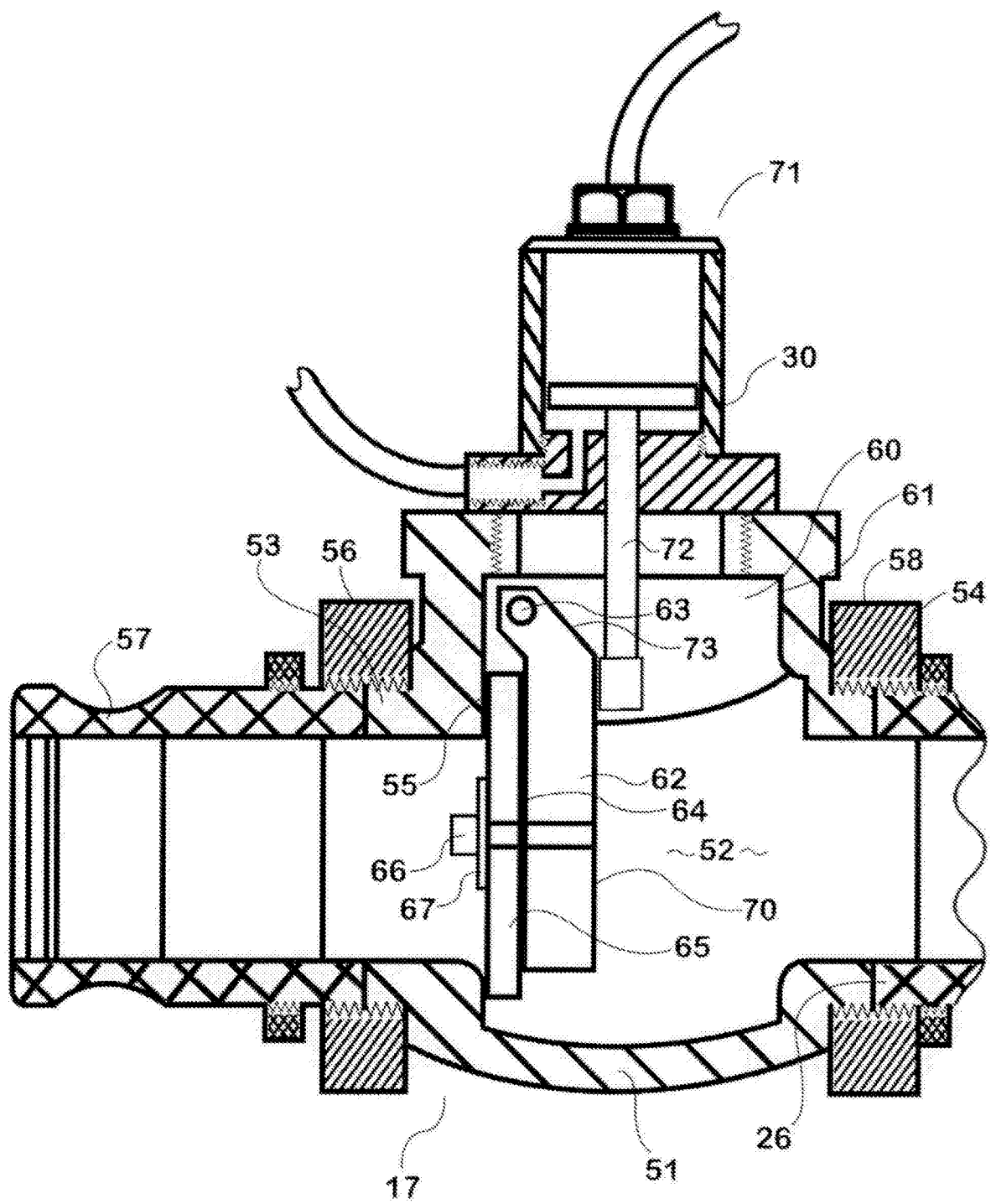
FIG. 4 is a detail sectional view of a swing valve suitable for use in the embodiment of FIG. 1.

As best illustrated in FIG. 4 the inlet assembly 17 includes a cast stainless steel valve body 51 having a swing chamber 52 interposed between an inlet end 53 and an outlet end 54. An annular, integral valve seat 55 is formed in the swing chamber about an opening into the inlet end 53. The inlet end 53 mounts a threaded collar 56 supporting a cam-lock male spigot 57. The outlet end 54 mounts a threaded collar 58 supporting a threaded side branch of the T-connector 26.

A chamber extension 60 includes a bore 61 that is substantially perpendicular to the flow path through the valve.

A valve gate assembly comprises a stainless steel supporting body 62 pivoted at 63 to the walls of the chamber extension 60 and has a front surface 64 that mounts a resilient polyurethane valve closure disc 65 with a bolt 66 and spreader washer 67. The front surface 64 lies in a plane that includes the pivotal axis of the valve gate. The supporting body 62 has a back surface 70 adapted to cooperate with valve closer means 71 comprising a double acting, linear actuator dashpot actuator 30 screw-mounted to the chamber extension 60 to present a push rod 72 adapted to pass closely adjacent the back surface 70. The back surface 70 includes a camming surface portion 73 that the pushrod 72 will first contact if the valve is not fully closed.

In use, the apparatus may be housed in a removable housing 74 having an air supply cut-out 75, an inlet cut-out and an outlet cut-out (not shown). The cover includes bolt holes 77 adapted to secure the cover 74 to the frame 11 at mount tags 80.

It will of course be realised that while the above has been given by way of illustrative example of this invention, all such and other modifications and variations thereto as would be apparent to persons skilled in the art are deemed to fall within the broad scope and ambit of this invention as is set forth in the claims appended hereto.

The invention claimed is:

1. A pneumatic pump including:
    a supporting frame adapted for positioning against a surface;
    a pressure vessel in the form of a flattened, spherically-derived shape supported by said frame and having a transfer port and ventilation port, wherein, when the supporting frame is positioned against the surface, the pressure vessel is flattened in a first plane that extends away from the surface, the transfer port is located towards the surface, and the ventilation port is located away from the surface;

a transfer assembly communicating with said transfer port and including an inlet for pumpable material, and a delivery outlet, one or both of said inlet and said outlet having a non-return valve;

a constant-flow, compressed air-operated venturi assembly having a suction side communicating with said ventilation port and an exhaust vent including closure means selectively operable to cycle said ventilation port between a suction phase and a pressurized phase, venturi exhaust air during said suction phase being selectively vented to a diffuser or muffler or injected into a delivery line portion downstream of said outlet by a manual two-way valve; and control means being adapted to selectively operate said closure means.

2. The pneumatic pump according to claim 1, wherein the spherically-derived shape is in the form of a disc flattened in the first plane, wherein penetration of the transfer port occurs at a position tangential to the disc.

3. The pneumatic pump according to claim 1, wherein the transfer assembly comprises a conduit extending from the transfer port and having a T-connection with side branch connection adjacent the transfer port and an axial connection adjacent the side branch connection.

4. The pneumatic pump according to claim 1, wherein the constant flow, compressed air-operated venturi assembly comprises an elongate venturi body comprising a venturi orifice interposed between the suction side communicating with said ventilation port and the exhaust vent, the orifice cooperating with an air jet supplied by an external compressed air source to induce fluid flow in the pressure vessel while the closure means is open.

5. The pneumatic pump according to claim 1, wherein the closure means is selected from low inertia and/or balanced valves operated by a pneumatic actuator.

6. The pneumatic pump according to claim 1, wherein the control means comprises an air jet into the venturi assembly.

7. The pneumatic pump according to claim 1, wherein at least the inlet comprises a non-return valve.

8. The pneumatic pump according to claim 7, wherein the non-return valve or valves each comprises a swing valve.

9. The pneumatic pump according to claim 8, wherein at least the inlet swing valve is positively assisted and maintained in a closed position by an actuator controlled in relation with the closure means.

10. The pneumatic pump according to claim 9, wherein the swing valve includes:

a valve body having a swing chamber interposed between an inlet and an outlet of the swing valve and defining a flow axis therethrough and a chamber extension extending away from the flow axis;

an annular valve seat located in said swing chamber about an opening into said inlet;

a valve gate assembly mounted in said chamber and comprising a supporting body pivoted to walls of the chamber extension and having a front surface that mounts a resilient valve closure disc, and adapted to move between a closed position with said resilient valve closure disc substantially occluding said opening and an open position whereby fluid may pass from said inlet to said outlet; and valve closer means comprising a linear actuator mounted on the chamber extension and presenting a push rod operable to selectively urge and maintain said valve gate assembly in said closed position, the supporting body having a back surface adapted to cooperate with the push rod.

11. The pneumatic pump according to claim 10, wherein the back or body portion surface includes a camming surface portion that the pushrod will first contact if the valve is not fully closed.

12. The pneumatic pump according to claim 10, wherein said resilient valve closure disc is formed of polyurethane.

* * * * *